United States Patent [19]
Johnson

[11] 3,730,443
[45] May 1, 1973

[54] FIELD CRUSHER FOR GRAPES

[75] Inventor: Wallace J. S. Johnson, Berkeley, Calif.

[73] Assignee: Up-Right, Inc., Berkeley, Calif.

[22] Filed: Sept. 24, 1971

[21] Appl. No.: 183,333

[52] U.S. Cl.................................241/82.1, 56/330
[51] Int. Cl...........................A01f 35/22, A47j 19/02
[58] Field of Search.................146/172, 174, 76 R; 56/330

[56] References Cited

UNITED STATES PATENTS

| | | |
|---|---|---|
| 1,971,546 | 8/1934 | Tuttle..........................146/174 UX |
| 2,101,620 | 12/1937 | Lewis...................................146/174 |
| 3,478,796 | 11/1969 | Rafanelli..............................146/174 |

FOREIGN PATENTS OR APPLICATIONS 14,994  1/1912  France....................................146/174

Primary Examiner—Willie G. Abercrombie
Attorney—Mellin, Moore & Weissenberger

[57] ABSTRACT

An elongated tube in which an axially disposed shaft with helically arranged radial rods thereon rotates to convey harvested grapes through the tube, the rods acting to crush and remove stems from the grapes as they are so conveyed. The crushed grapes discharge from the tube through a flexible conduit into a tank filled with an inert, non-oxidizing gas to displace the gas upwardly into and through the tube, the gas filling the tube and exiting therefrom at the point where the grapes enter the tube so that the grapes are protected from oxidizing air after they enter the tube.

8 Claims, 7 Drawing Figures

PATENTED MAY 1 1973
3,730,443
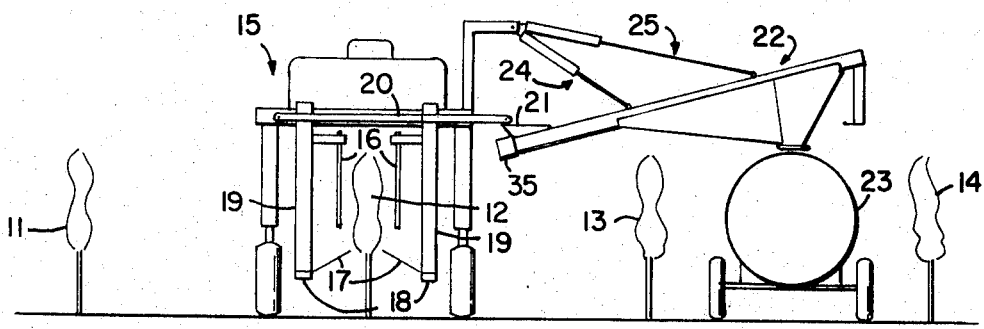
FIG_1
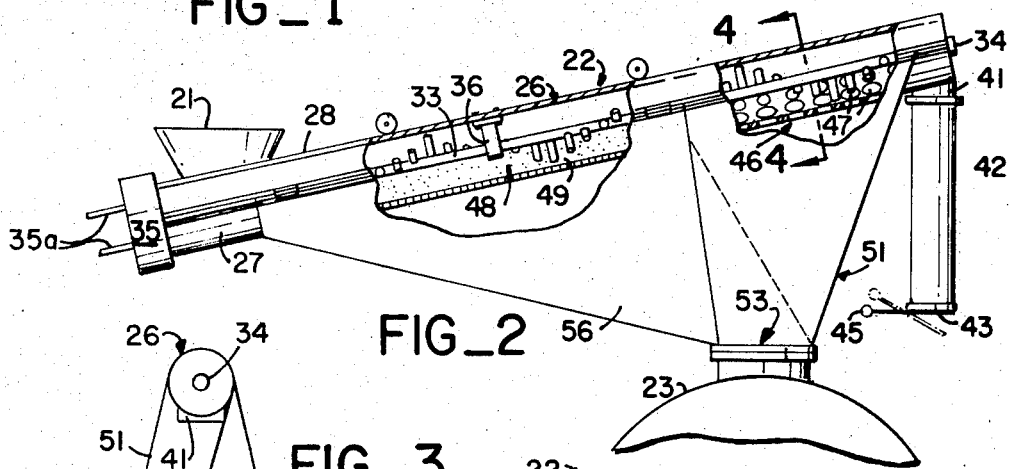
FIG_2
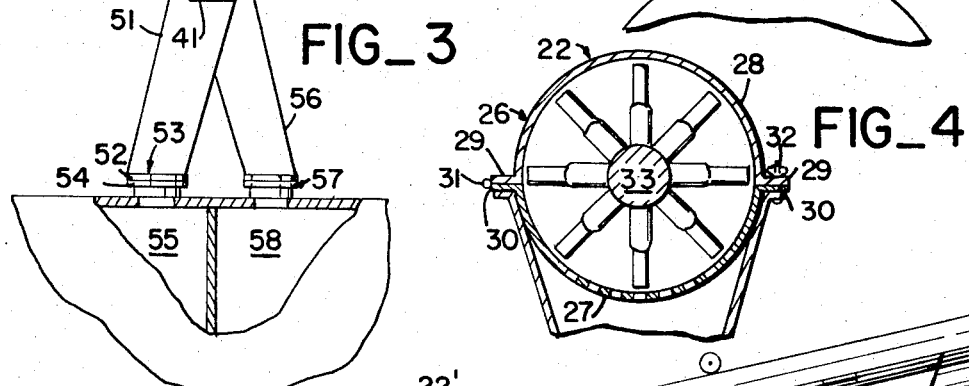
FIG_3
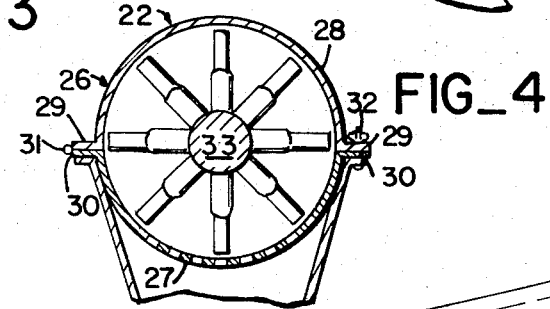
FIG_4
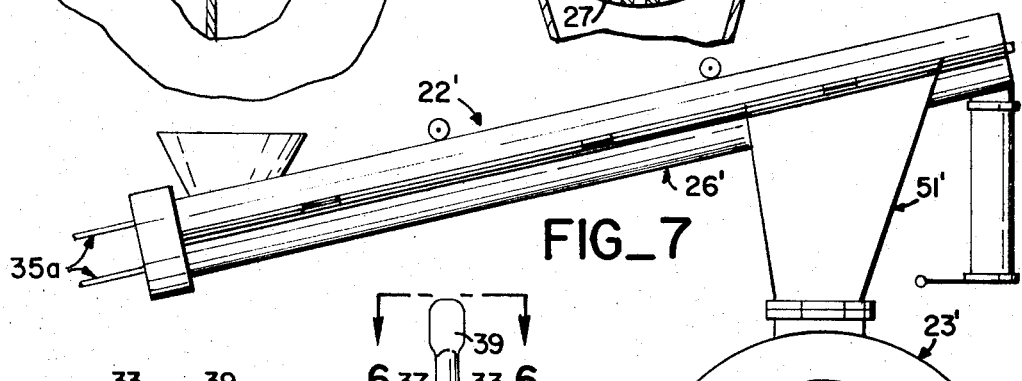
FIG_7
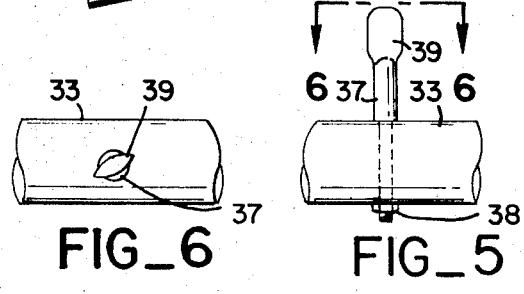
FIG_6
FIG_5
INVENTOR.
WALLACE J.S. JOHNSON
BY
Mellin, Moore + Weissenberger
ATTORNEYS

FIELD CRUSHER FOR GRAPES

BACKGROUND OF THE INVENTION

In the wine-making art, grapes have traditionally been harvested in the field and then hauled to a winery where they are dumped into stationary machines which remove the remaining stems and crush the grapes into must.

With the advent of mechanical grape-harvesting machines, it has been found desirable to mount stemming and crushing devices on the harvesters so that the grapes may be continuously stemmed and crushed into must as the harvester moves down a row of vines. An example of such a field crusher is that shown in my copending U. S. application Ser. No. 101,176, filed Jan. 18, 1971, and entitled "Apparatus for Crushing Fruit in an Inert Gas," now abandoned. At present, all field crushers are mounted directly on the harvesters and are fed with harvested grapes by separate conveyors carried by the harvester. The crushed must discharges from the crusher into a storage compartment therebelow which is also mounted on the harvester. Since the storage compartment is necessarily limited in size, the must is periodically discharged therefrom into a tank trailer towed down the next adjacent row space at the same speed as the harvester.

In the United States, vineyards planted for mechanical harvesting are typically planted with rows of vines spaced about 12 feet apart, with the vines being typically 5 to 7 feet in height. A crusher mounted on the harvester receives the grapes from the harvester conveyor at a typical height of 7½ to 8 feet with the bottom of the crusher storage compartment being typically about 4 feet above ground. Therefore, separate power, in the form of a pump or by gas pressure, is required to discharge the crushed must from the bottom of the storage compartment up and over the next row of vines and into the tank trailer being towed parallel to the harvester.

When field crushing of grapes is being carried out in an inert gas protective atmosphere, as in my above-referred-to application, and it becomes necessary in the middle of a row of vines to discharge must from the storage compartment into the tank trailer, the harvester operator must keep the crusher filled with inert gas from a bottled supply thereof on the harvester. If the gas supply runs out or if the operator inadvertently fails to turn it on, then oxidizing air will be sucked into the crusher.

SUMMARY OF THE PRESENT INVENTION

The present invention provides a combination conveyor-stemmer-crusher device which is mounted on the harvester so that the harvested grapes discharge into one end of the device, the other end of the device being connected to a tank trailer towed parallel to the harvester. As a conveyor, the device conveys the harvested grapes over the next row of vines to the awaiting tank trailer. While so doing, the grapes are stemmed and crushed, with the crushed must dropping by gravity into the tank trailer and the stems discharging into a stem receptacle where they are periodically dumped to the ground. A single power means alone is required to convey, stem, crush and discharge.

As mentioned above, when the relatively limited-capacity crusher storage compartment mounted on the harvester becomes full, it is necessary for the harvester operator to discharge must therefrom. Since a separate tank trailer can have a much greater capacity than a harvester-mounted storage compartment, far more grapes may be harvested before it is necessary for the operator to do anything but harvest grapes.

The present invention also provides a simple way to obtain juice separation. Some vintners of quality wine are anxious to separate "free run" juice, i.e., the juice that freely separates as the grapes are crushed, from the pulp, skins and seeds.

Further, the device is fully enclosed, making it particularly useful in operations wherein the crushing is to be carried out in an inert gas atmosphere. When the discharge outlet is connected to a tank trailer filled with inert gas, the only escape for the gas, as it is displaced by crushed grapes, is up into and through the device, the gas exiting at the point where the grapes enter. Since the tank trailer will be initially full of inert gas, there is no need to carry a gas supply on the harvester, and the harvester operator can devote his full attention to the actual harvesting of grapes.

Other objects and advantages will become apparent in the course of the following detailed description.

BRIEF DESCRIPTION OF THE DRAWINGS

In the drawings forming a part of this application, and in which like parts are designated by like reference numerals throughout the same, FIG. 1 illustrates a field crusher constructed in accordance with the present invention as used in a vineyard with a mechanical harvester and a tank trailer;

FIG. 2 is a side elevational view with portions cut away, of the field crusher of FIG. 1;

FIG. 3 is an end view of the field crusher of FIG. 1, with the stem chute removed, and showing the manner in which it connects to a double compartmented tank trailer;

FIG. 4 is a sectional view of the field crusher, taken on line 4—4 of FIG. 2;

FIG. 5 is a detail view illustrating the shape of one of the impeller rods and its attachment to the central shaft;

FIG. 6 is the same as FIG. 5, with the shaft being rotated 90°;

FIG. 7 is a side elevational view, with portions cut away, of a modified field crusher.

DESCRIPTION OF THE PREFERRED EMBODIMENT

FIG. 1 illustrates a typical vineyard, looking down the parallel rows of vines 11, 12, 13 and 14. A mechanical harvester 15, for example that shown and described in Claxton and Horn U. S. application Ser. No. 101,910, filed Dec. 28, 1970, entitled "Method and Apparatus for Harvesting Fruit with an Elliptically Moving Striker Member," and assigned to the assignee of the present application, now U.S. Pat. No. 3,667,201 straddles vine row 12 and is driven slowly along the length thereof. Striker rods 16 beat against the vines to dislodge the grapes therefrom, the grapes falling onto the aprons 17 and into longitudinal conveyors 18. These conveyors empty into the upwardly inclined conveyors 19 which in turn empty into a cross conveyor 20. The harvested grapes discharge from conveyor 20 into the open-topped hopper 21 of the field crusher 22 and are conveyed up over vine row 13 and into the tank trailer 23, which typically may have a 1000-gallon capacity. Trailer 23 is towed between vine rows 13 and 14 by a suitable tractor (not shown) at the same speed as harvester 15. The field crusher is supported on the harvester 15 by hydraulic ram devices 24 and 25.

As best seen in FIGS. 2 and 4, the field crusher 22 includes an elongated tube 26 made up of a semicircular trough 27 and a semicircular cover 28. The trough and cover are provided with outwardly projecting flanges 29 and 30 which extend the length thereof. The trough and cover flanges are hinged along one side thereof, as at 31, while the flanges along the opposite side are detachably connected to each other, as by bolts 32.

Shaft 33 extends axially of tube 26, the shaft being journaled for rotation therein by sealed bearings 34 at either end of tube 26, the shaft being driven by a hydraulic motor 35 mounted on the harvester end of cover 28. The motor 35 is connected by suitable hydraulic lines 35a to the hydraulic system of harvester 15. If necessary, the shaft 33 may be supported by one or more intermediate bearings 36 suspended from cover 28 so as to cause least obstruction to the grapes, leaves and debris going through the tube.

Mounted on shaft 33 are a plurality of radially extending impeller rods 37 spaced from one another and along the length of the shaft in a helical pattern thereon. The rods may be welded to shaft 33 or, as shown in FIGS. 5 and 6, the rods 37 may shoulder against the shaft with a reduced-diameter shank extending through the shaft and being held in place by nut 38. The outer ends 39 of the rods are preferably flattened, with the flattened ends being positioned in the same helical pattern as the rods. The method of rod mounting illustrated in FIGS. 5 and 6 is advantageous in that the pitch of the flattened ends may be easily adjusted to vary the crushing and conveying action of the device.

Merely by way of illustration, in one design of the field crusher, tube 26 is approximately 9 inches in inside diameter and 12½ feet long, shaft 33 is approximately 2⅜ inches in diameter and rods 37 are ¾ inch in diameter with about 1/2 inch clearance between the ends of the rods and the inside of tube 26. The rods are spaced about 1¼ inches axially and 30° circumferentially on shaft 33. The rod ends 39 are flattened to 1 inch wide.

The outer lower end of the trough 27 opens into a downwardly directed flange 41 to which a lightweight flexible chute 42 is attached. The lower end of chute 42 is normally closed by a damper plate 43, hinged to the chute at 44 and held in closed position by weight 45.

A first set 46 of apertures 47 is provided through the lower surface of tube 26 adjacent the discharge end thereof, these perforations being sufficiently large to enable crushed grapes to pass therethrough. In the above-referred-to design, the lower 120° arc of trough 27 is provided with closely spaced 1-inch diameter holes for approximately 5 feet of the tube length.

A second set 48 of apertures 49 is provided through the lower surface of tube 26 adjacent the first set and extending substantially towards the entry end of the tube. These apertures must be sufficiently smaller than the first set so that crushed grapes will not pass therethrough and sufficiently large so that free-run juice will drain easily therethrough.

A flexible chute 51, preferably made from nylon cloth, is secured along its upper end in sealed relation to trough 27 and underlies the length of the first set 46 of apertures. The lower end of chute 51 is sealed to the upper ring 52 of a quick disconnect fitting 53, the lower ring 54 of which is mounted on tank trailer 23, thus enabling the crushed grapes to fall through chute 51 into compartment 55 of the tank trailer.

Similarly, a flexible chute 56, again preferably of nylon cloth, is secured along its upper end in sealed relation to trough 27 and underlies the second set 48 of apertures. The free-run juice thus may drain by gravity down through chute 56 and connectors 57 into compartment 58 of tank trailer 23. If desired, instead of using chute 56, an enclosed drip pan could be disposed on trough 27 beneath the second set of apertures, with a flexible hose draining the drip pan by gravity into tank trailer compartment 58.

In operation of the above-described apparatus, the tank trailer 23 will have its compartments 55 and 58 full of inert gas, such as carbon dioxide, under some superatmospheric pressure (as a result of its previous discharge). The connections 53 and 57 are opened and chutes 51 and 56 quickly connected thereto. The carbon dioxide in the compartments can expand upwardly through the chutes 51 and 56 and the tube 26, with some carbon dioxide exiting from the hopper 21 until the pressure is equalized.

As grapes are harvested, they are dumped into the hopper 21 and drop down into the tube 26 where they are contacted by the rotating radially extending rods 37. The speed of rotation of shaft 33 is not critical, except that it must be driven at a sufficiently high speed to cause a screw conveyor action on the grapes. Speeds of 100 r.p.m. or higher may be used, for example.

As the rotating rods strike the grapes they will impel them forwardly through the tube. At the same time the impetus of striking will cause the grapes to crush and will dislodge the stems therefrom. It should be noted that in harvesting machines of the transverse striking type, e.g., as disclosed in the previously mentioned U. S. application Ser. No. 101,910, the grapes are knocked off the vines individually or in small clusters, with only about 10 percent of the stems being left on the grapes, as opposed to vertically impacting harvesters wherein whole grape bunches are harvested. Thus, with only about 10 percent of the stems left on the grapes, there is little likelihood of clogging of the tube 26 with stems.

As the grapes are crushed, the free-run juice drains through the perforations 49 and down into the tank trailer compartment 58. The remaining grapes and crushed grapes stay in tube 26, being more and more crushed as they progress therethrough. The flattened ends of the rods, oriented in the helical pattern of the rods provides an efficient conveying impetus to the grapes, urging them towards the discharge end. Finally, the crushed grapes reach the larger perforations 47 and drop down into tank compartment 55.

The separated stems are too large to pass through the perforations 47 and they are pushed to the end of tube 26 and fall down into the stem chute 42. The bottom of the stem chute is normally closed by the damper plate 43 to prevent the carbon dioxide gas in tube 23 from spilling down the stem chute. When sufficient stems have accumulated in the stem chute, their weight will cause damper 43 to open so that the stems will discharge onto the ground. After discharge, the damper will pivot back to closed position, again closing the chute against loss of carbon dioxide gas therefrom. In the event that carbon dioxide or other protective gas were not used in the system the damper could be omitted and the stems would be continuously ejected from the device.

As the free-run juice and must accumulates in the tank trailer, the carbon dioxide therein will be displaced upwardly into the tube 23, and will flow therethrough countercurrent to the movement of grapes so that a protective atmosphere will continually be provided in the device during the crushing operation.

When the tank trailer is sufficiently full and at the end of a row, the contents may be discharged into a larger tank truck by injecting carbon dioxide under pressure into the trailer compartments and forcing the contents out through the conventional bottom discharge connections on the trailer.

FIG. 7 illustrates a modification 22' of the invention for use in instances where no juice separation is desired. This modification varies from that previously described in that it does not have the set of smaller perforations for free-run juice; other than that, it is the same in construction and operation as that of FIG. 2. The free-run juice will be swept through the tube 26', even though the tube is disposed at an upward angle, by the mass of crushed grapes therein so that the free-run juice will flow through the large perforations along with the crushed grapes and fall through the flexible chute 51' into the tank trailer 23'.

Both modifications have a common advantage in that the suspension from the harvester and the flexible chutes 51 and 56 or 51' connecting to the tank trailer allow the tube 26 to pivot relative to either the harvester or the tank trailer in a horizontal plane so that errors in maintaining exact unison between the driver of the harvester and tank trailer do not disconnect the flexible chutes from the tank trailer. Also, the flexible chutes allow the tube 26 to pivot relative to the tank trailer in a vertical plane to permit driver steering errors and traverse over uneven ground without detaching or damaging the connection between the vehicles and the field crusher.

The hydraulic ram suspension of the field crusher from the harvester also enables the crusher to be easily adjusted so that the tube 26 is horizontal or at an angle, which in turn provides a simple means of controlling conveying rate and crushing rate. In creasing the upward angle slows down the conveying rate and increases the crushing action, and vice versa.

The field crusher may be easily cleaned or repaired by swinging the trough 27 downwardly about its hinge connection with the cover 28 to expose all interior surfaces.

Having thus described my invention, I claim:

1. A field crusher for grapes comprising:
   a. an enclosed elongated tube adapted to be disposed at a substantial axial inclination from vertical, said tube having an entry opening at one end thereof and a set of apertures through the under surface thereof adjacent the other end of said tube, said apertures being sufficiently large to allow passage of crushed grapes therethrough,
   b. means disposed in said tube for conveying grapes from said entry opening to said apertures and for crushing said grapes as they are so conveyed,
   c. an enclosed chute having its upper end connected and sealed to said tube to receive discharge from said set of apertures and having a lower end adapted to be connected to a compartment of a receiving tank, said chute being sufficiently flexible to enable said tube to pivot horizontally and vertically relative to said tank when connected thereto.

2. A field crusher as set forth in claim 1, wherein said means (b) for conveying and crushing grapes comprises a power-driven shaft extending axially through said tube and journaled for axial rotation therein, and a plurality of radially extending rods secured to said shaft, said rods being spaced from one another and along said shaft in a helical pattern thereon.

3. A field crusher as set forth in claim 2, wherein the outer ends of said rods are flattened in the direction of the helical pattern of said rods.

4. A field crusher as set forth in claim 1 and further including:
   d. an enclosed stem chute disposed at the other end of said tube and having its upper end open to the interior of said tube,
   e. means normally closing the lower end of said stem chute and operable to open said lower end in response to a predetermined weight of stems in said chute.

5. A field crusher as set forth in claim 1, wherein said tube has a second set of apertures through the lower surface thereof between said first set of apertures and said entry opening, said apertures of said second set being sufficiently small to prevent passage of crushed grapes therethrough and sufficiently large to allow juice to drain therethrough, and further including:
   d. means connected to said tube to collect juice draining through said second set of apertures and to conduct said collected juice downwardly, said means having a lower end adapted to be connected to a compartment of said receiving tank for discharge of the collected juice thereinto, said means being sufficiently flexible to enable said tube to pivot vertically and horizontally relative to said tank when connected thereto.

6. A field crusher as set forth in claim 5, wherein said means (b) for conveying and crushing grapes comprises a power-driven shaft extending axially through said tube and journaled for axial rotation therein, and a plurality of radially extending rods secured to said shaft, said rods being spaced from one another and along said shaft in a helical pattern thereon.

7. A field crusher as set forth in claim 6, wherein the outer ends of said rods are flattened in the direction of the helical pattern of said rods.

8. A field crusher as set forth in claim 5 and further including:

e. an enclosed stem chute disposed at the other end of said tube and having its upper end open to the interior of said tube, f. means normally closing the lower end of said stem chute an operable to open said lower end in response to a predetermined weight of stems in said chute.

* * * * *